Figure 1:
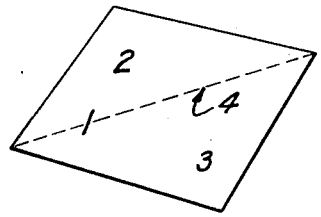

May 8, 1934.  A. SINGER  1,958,384
PAPER NAPKIN
Filed Nov. 17, 1932   3 Sheets-Sheet 1

INVENTOR.
Abraham Singer

May 8, 1934.  A. SINGER  1,958,384
PAPER NAPKIN
Filed Nov. 17, 1932  3 Sheets-Sheet 2
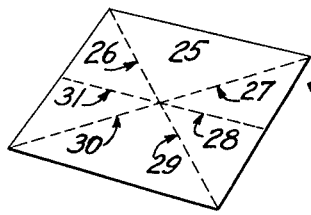 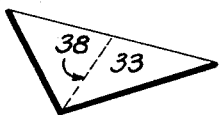 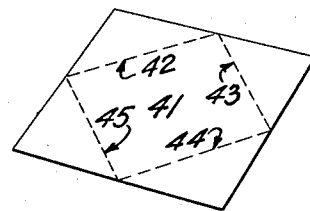 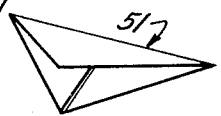
Fig.19.  Fig.24.  Fig.28.  Fig.33.
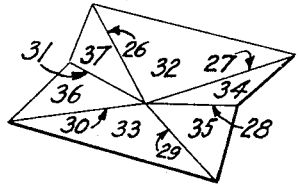 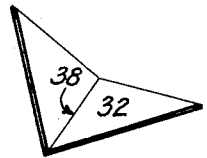 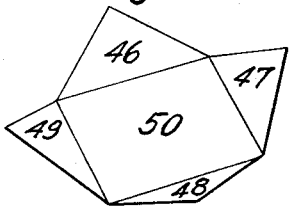 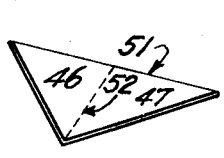
Fig.20.  Fig.25.  Fig.29.  Fig.34.
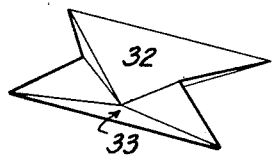 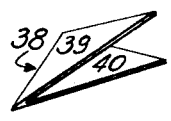 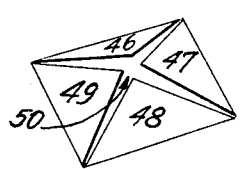 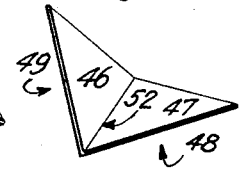
Fig.21.  Fig.26.  Fig.30.  Fig.35.
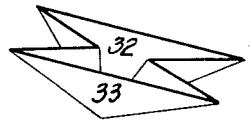 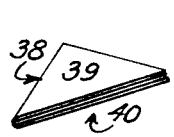 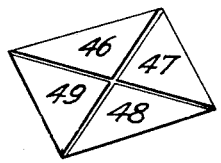 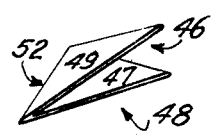
Fig.22.  Fig.27.  Fig.31.  Fig.36.
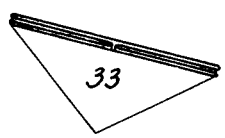 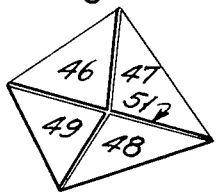 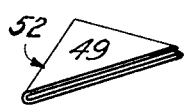
Fig.23.  Fig.32.  Fig.37.
INVENTOR.
Abraham Singer May 8, 1934.  A. SINGER  1,958,384
PAPER NAPKIN
Filed Nov. 17, 1932  3 Sheets-Sheet 3

INVENTOR:-
Abraham Singer

Patented May 8, 1934

1,958,384

UNITED STATES PATENT OFFICE 1,958,384

PAPER NAPKIN

Abraham Singer, New York, N. Y.

Application November 17, 1932, Serial No. 643,003

2 Claims. (Cl. 206—57)

My invention relates to a paper napkin package and more particularly contemplates a novel method of folding which will produce a triangular folded napkin in such an arrangement of folds that it can be easily gripped from a novel triangular container.

This comprises a method by which at least one of the short edges of the triangle offers one solid edge by which one napkin at a time may be conveniently grasped from a bunch of such napkins arranged side by side in the container.

Another important object of the invention is in the production of the napkin, which is easily manufactured, which can readily be folded in compact space and which can be expeditiously removed from an appropriate triangular container.

Another important object is the novel method of folding which overcomes the present inefficient methods of grasping a napkin which presents a multiplicity of grasping edges.

The invention will be more thoroughly understood in the following specification and in the drawings.

Figure 6:
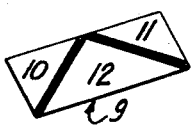
Figure 2:
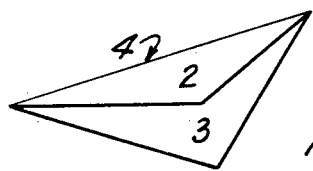
Figure 7:
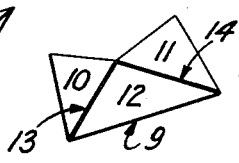
Figure 3:
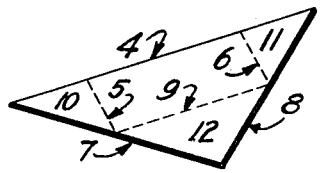
Figure 8:
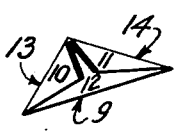
Figure 4:
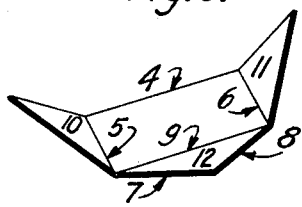
Figure 9:
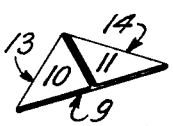
Figure 5:
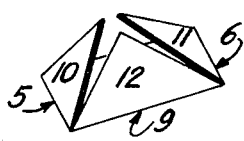

Figure 1 is a plan view of the blank;
Figure 2 is a perspective view of a folded blank;
Figure 3 is a plan view of the folded blank;
Figure 4 is a perspective view of the blank folded in a different position;
Figure 5 is a perspective view showing the blank folded again;
Figure 6 is a plan view of the folded blank in a different position;
Figure 7 is a perspective view of the napkin in a different folded position;
Figure 8 is a perspective view similar to Figure 7;
Figure 9 is a plan view of the triangular napkin completely folded.

Figure 10:
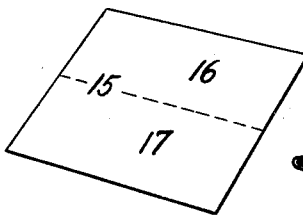
Figure 15:
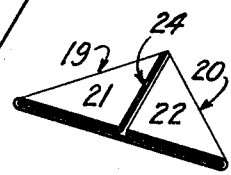
Figure 11:
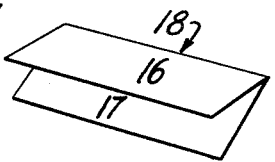
Figure 16:
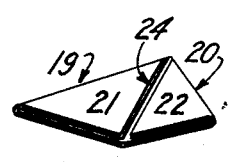
Figure 12:
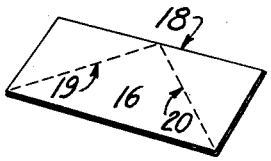
Figure 17:
Figure 13:
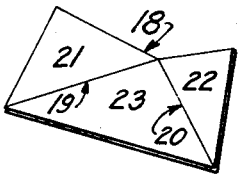
Figure 18:
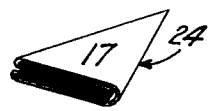
Figure 14:
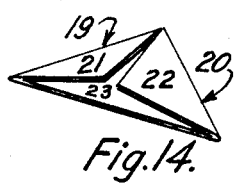

In another embodiment of the invention Figure 10 is a plan view of the blank;
Figure 11 is a perspective view of the folded blank;
Figure 12 is a plan view of the folded blank;
Figure 13 is a perspective view of the blank being folded in a different position;
Figure 14 is a perspective view similar to Figure 13;
Figure 15 is a plan view of the folded blank in a different position;
Figure 16 is a perspective view of the folded blank in a different position;
Figure 17 is a perspective view similar to Figure 16;
Figure 18 is a plan view of the triangular napkin in completely folded position.

In another embodiment of the invention,
Figure 19 is a plan view of a blank;
Figures 20, 21, and 22 are perspective views of partially folded blanks;
Figure 23 is an elevational view of the folded blanks;
Figure 24 is a plan view of the folded blank;
Figures 25 and 26 are perspective views of the blanks in different folded positions;
Figure 27 is a plan view of the triangular napkin in a completely folded position.

In another embodiment of the invention,
Figure 28 is a plan view of the blank;
Figures 29 and 30 are perspective views of the folded blanks;
Figure 31 is a plan view of a folded blank;
Figures 32 and 33 are perspective views of the blanks folded in different positions;
Figure 34 is a plan view of the folded blank;
Figures 35 and 36 are perspective views of the blanks folded in still different positions;
Figure 37 is a plan view of the triangular napkin in completely folded position.

Figure 38:
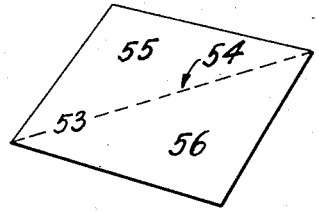
Figure 43:
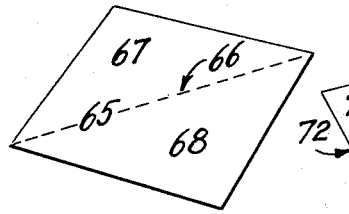
Figures 47, 52:
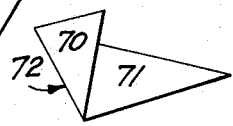
Figure 39:
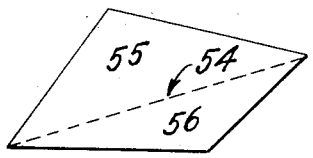
Figure 44:
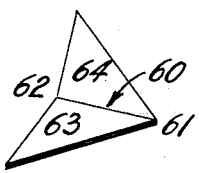
Figure 48:
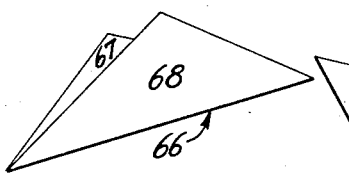
Figure 53:
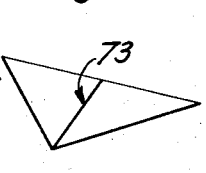
Figure 40:
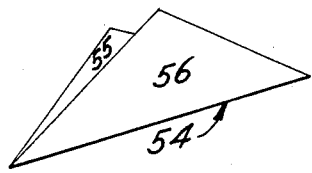
Figure 45:
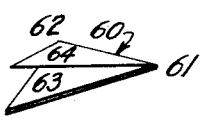
Figure 49:
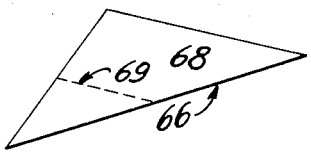
Figure 54:
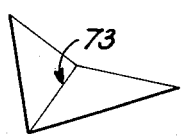
Figure 41:
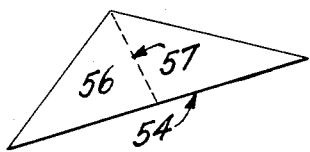
Figure 46:
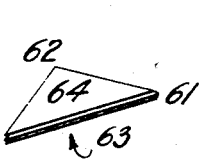
Figure 50:
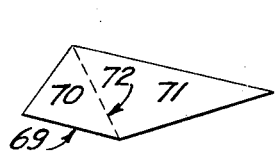
Figure 55:
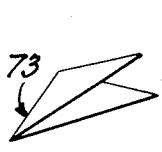
Figure 42:
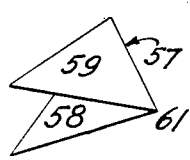
Figure 51:
Figure 56:
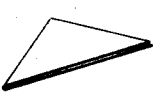

In another embodiment of the invention,
Figure 38 is a plan view of the blank;
Figures 39 and 40 are perspective views of the blank folded in different positions;
Figure 41 is a plan view of the folded blank;
Figure 42 is a perspective view of a blank folded in a different position;
Figure 43 is a plan view of the blank corresponding to Figure 42;
Figures 44 and 45 are perspective views of the blanks folded in still different positions;
Figure 46 is a plan view of the triangular napkin in a completely folded position;

In another embodiment of the invention,
Figure 47 is a plan view of a blank;
Figure 48 is a perspective view of the folded blank;
Figure 49 is a plan view of the folded blank;
Figure 50 is a plan view of the blank folded in different position;
Figures 51 and 52 are perspective views of the blanks folded in still different positions;
Figure 53 is a plan view of the blank folded in a different position;
Figures 54 and 55 are perspective views of the blank folded in different positions;
Figure 56 is a plan view of a triangular napkin in a completely folded position.

Referring to the first embodiment numeral 1 represents a rectangular napkin blank having the opposed folded portions 2 and 3 foldable on the fold line 4 to form opposed foldable portions as depicted in Figure 3; referring to the latter figure there are positioned parallel score lines 5 and 6, extending between the common edge 4 and the opposed edges 7 and 8 of the triangular portions; there is another score line 9 running parallel with the edge 4.

Referring to Figures 4 and 5 there are produced three triangular opposed and adjacent parts 10, 11, and 12, which are folded over on the fold lines 5, 6 and 9 to produce the structure as indicated in Figure 6. The blank 1 is again folded on the diagonally positioned fold lines 13 and 14, to produce the structure as depicted in Figure 8; and the triangular napkin in completely folded position as represented in Figure 9.

Referring to the second embodiment of the invention, the numeral 15 represents a blank having the two folded portions 16 and 17 foldable on the transverse fold line 18, as shown in Figure 12. The folded blank as depicted in Figure 12 is then again folded on diagonal fold lines 19 and 20 to produce the opposed folded parts 21 and 22 and section 23, as depicted in Figures 14 and 15. Referring to Figures 16 and 17 the blank is folded on fold line 24, to produce the finished triangular structure as shown clearly in Figure 18.

Referring to the third embodiment of the invention, numeral 25 represents a rectangular blank having a plurality of diagonal and other fold lines 26—30 inclusive. The napkin blank is folded along the diagonal fold lines forming opposed triangular portions 32—33 and other adjacent portions 34—35—36—37. The folded napkin blank as depicted in Figure 24 is then folded again on the fold line 38 to form triangular parts or portions 39—40 as represented in Figures 26 and 27.

Referring to another embodiment of the invention, numeral 41 represents a rectangular blank which is folded on the angularly positioned fold lines 42—45 inclusive, to form the triangular portions 46—49 inclusive and the central portion 50 as shown in Figure 31. The folded blank is again folded on the fold line 51 to form the napkin in the position shown in Figure 34. Referring again to the latter figure, the folded napkin is again folded on the transverse fold line 52 to yield a napkin in completely folded form as shown in Figure 37.

In another embodiment of the invention, numeral 53 represents a rectangular blank folded on fold line 54 to produce opposed triangular portions 55—56 as shown in Figure 40. Referring to Figure 41 the folded blank is again folded on fold line 57 positioned at right angles to fold line 54 to produce foldable parts 58 and 59. Referring to Figure 43 the refolded blank is folded again on another fold line 60, extending from vertex 61 to base 62 of foldable part 59 to produce folded triangular sections 63 and 64 as shown in Figure 46.

Referring to another embodiment of the invention, numeral 65 designates a rectangular blank foldable on the fold line 66 to produce opposed triangular portions 67 and 68 as shown in Figure 48; the folded blank is then refolded on the fold line 69 to form sections or parts 70—71 as shown in Figure 50. This structure is then refolded on fold line 72 to yield a structure as depicted in Figure 53; the folded blank is again refolded once more on line 73 to yield a structure as shown in Figures 54 and 56.

In all the different embodiments of the invention the blanks are folded on the various fold lines which are then refolded on a plurality of consecutive fold lines as depicted in Figures 1 to 56 to ultimately yield in each particular case a triangular shaped napkin which is folded on a plurality of fold lines. The net result is to take a rectangular blank and subsequently fold and refold this blank into a plurality of triangular parts, portions or sections, to yield a triangular napkin which presents a convenient instrumentality for grasping with only one solid edge exposed on one or both of the short edges of the triangularly shaped napkin.

In the first embodiment, the triangular napkin results from subsequent folding on lines 4, 5, 6, 9, 13, and 14; while in the next embodiment the triangular napkin results from folding on lines 18, 19, 20, and 24. In the next embodiment the triangular napkin results from folding on lines 26 to 31 inclusive and then on line 38; while in the following embodiment the triangular napkin results from folding on lines 42 to 45 inclusive, then on lines 51 and 52. In the next embodiment the triangular napkin results from folding on lines 54, 57 and 60; while in the last embodiment the triangular napkin results from folding on lines 66, 69, 72 and 73; so that apparently in all cases the napkin results in folding on more than 3 fold lines.

This particular type of napkin is especially designed for use in a special triangular shaped receptacle and when these napkins are stacked therein each individual napkin can be readily grasped due to the particular method of distribution of the napkins from the container.

It will also be obvious that the napkin can be folded in numerous ways as will be apparent from the several species specifically described in this application and which have been broadly claimed in the following appended claims.

Having described my invention, what I claim is:

1. A napkin, said napkin consisting of a blank having opposed triangular folded portions, the latter having two spaced triangular folded parts, and a third triangular folded portion, the former folded on parallel fold lines extending between one common edge and opposed edges of the triangular folded portions.

2. A napkin, said napkin consisting of a blank having opposed triangular folded portions, the latter having two spaced triangular folded parts, and a third triangular folded part, the former folded on parallel fold lines, extending between one edge and opposed edges of the triangular folded portions, said triangular folded portions also having other triangular folded sections folded on diagonal lines extending parallel with and adjacent to the marginal edges of the third triangular folded parts.

ABRAHAM SINGER.